Nov. 8, 1966     D. H. FIETZ     3,283,567
INTERNAL HARDNESS TESTER
Filed Dec. 9, 1965
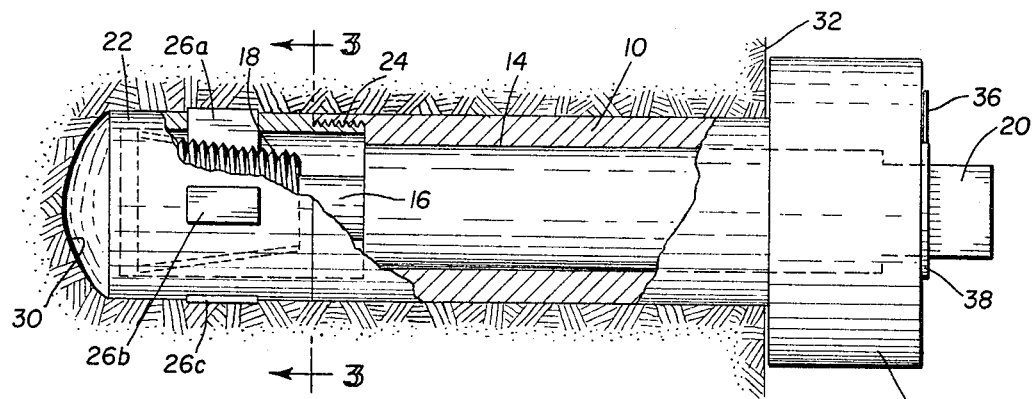
Fig_1
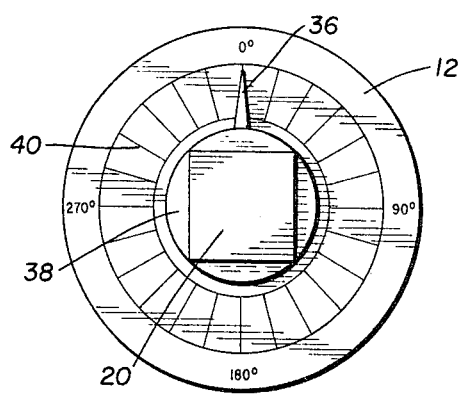
Fig_2
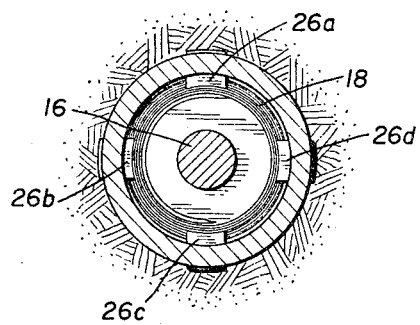
Fig_3
INVENTOR.
DALE H. FIETZ
BY
ATTORNEYS

United States Patent Office 3,283,567
Patented Nov. 8, 1966

3,283,567
INTERNAL HARDNESS TESTER
Dale H. Fietz, 510 Franklin St., Denver, Colo.
Filed Dec. 9, 1965, Ser. No. 512,664
6 Claims. (Cl. 73—84)

This application is a continuation-in-part of application Serial No. 340,934, filed January 29, 1964 by Dale H. Fietz entitled "Material Hardness Tester."

This invention relates generally to testers for material and more particularly to hardness testers for testing the hardness internally of a body of material through a hole bored into the material.

Commonly available material testers for testing the hardness of the material usually tests the hardness of the surface of the material. The testing of concrete is normally done by the use of samples taken from the plastic or unset concrete and formed into cylinders which are cured and later subjected to compressive testing. In another method of testing cement, a core of substantially the same size as the standard test cylinder is taken from a body of concrete, however, this leaves a substantial hole in the concrete itself which may completely destroy the usefulness of the concrete body.

An object of the present invention is to provide a novel tester for testing the hardness or compressive strength internally of a body of material, which requires no inspection of indentations made in the material.

Another object of the invention is to provide a novel hardness tester which is easily arranged to measure directly the hardness at a point internally of the body through a small bore hole drilled into the material.

Further objects and advantages of the invention may be readily ascertained by referring to the following description and appended illustrations, in which;

FIG. 1 is a side elevational view in partial section, of a tester according to the invention;

FIG. 2 is a front elevational view of the device of FIG. 1 showing an indicating scale; and FIG. 3 is cross-sectional view of the device of FIG. 1 taken along section line 3—3.

In the device illustrated a tubular member or guide tube 10 is provided with an enlarged head or hand portion 12. The head may be integral or removably attached. A cylindrical member or support body 14 is rotatably mounted in the tubular member 10 and at one end a neck 16 extends axially therebeyond and it connects with a threaded conical member 18. At the opposite end of cylinder 14 a tool hold or handle 20 is attached. The conical member 18 is mounted in a cap 22 which is threaded by means of threads 24 to the tubular member 10. The cylindrical member 14 is stepped down adjacent the tool hold 20 and is held in the head 12 thereby. Four pressure pads 26a through 26b are threadedly mounted on the conical member 18 and extend through openings in the cap 22. The pressure pads are arranged with their threads mated with the conical threads of the member 18. The pressure pads 26A through 26D are mounted at 90° to each other and arranged so that they will move radially inwardly and outwardly to the axis of the cap which is coincidental with the axis of the cylindrical member 14.

A scale 40 is mounted on the handle or head portion 12 and a pointer 36 mounted on the loss motion connection 38 is connected with manipulating end 20. The loss motion connection 38 provides means for setting the indicator 36 to any desired position on the scale.

The pressure pads are held in position by any convenient means as for example by a helical spring circumferentially extending around a groove through the cap and each of the four pressure pads. Also, the pads may be held in the cap by means of springs internally thereof, or magnetized to adhere to the conical member, etc.

The device is used by inserting it in a hole 30 bored in a body of material, for example, cement, steel, etc. Normally, the hole is deep enough so that the whole tube and cap telescopes into the hole with the head resting or abutting against the face 32 of the material. A torque wrench, for example a wrench set to 50 lbs. torque, is used to turn the manipulating handle to force the pads outwardly into the material in the bore. The head is held against rotation and the torque wrench is used to force the pads against the wall of the bore at predetermined pressure. This predetermined pressure is the base or reference and when this pressure is reached, the indicator 36 is turned to 0. A second torque wrench, or same torque wrench if adjustable, with an increased predetermined torque is used to turn the handle 20 to the higher predetermined torque. When the particular torque is reached, the number of degrees of revolution of turn of the indicator is then determined by reading the scale. The scale may be calibrated directly in a hardness scale, or a separate calibrating chart, for a particular material, may be used to read the hardness from the number of degrees of rotation indicated on the head scale. The hardness determination may, also, be done in the reverse manner, as for example, starting from the initial predetermined torque, returning the indicator to 0, and then by using a torque wrench, make one complete revolution (or other predetermined revolution) and determine the torque necessary to make one complete revolution. This torque can then be translated into hardness by calibration chart or the like.

For concrete testing, a device, made according to the invention, having less than an inch diameter and a length of about four inches has been found very satisfactory for most applications since a 1 inch bore hole is generally not detrimental. An even smaller diameter device may be made where a smaller bore is necessary. Also, the length may be changed to meet varying conditions. The number of pressure pads may, likewise, be changed as desired. For example, two or three may be used in place of the four pads.

While the invention has been illustrated by reference to a particular embodiment, there is no intent to limit the spirit or the scope of the invention to the precise details so set forth except as set out in the following claims.

I claim:

1. A device for use in determining hardness in a material internally thereof using a bore hole in the material, comprising a guide tube arranged to extend into a bore hole; a support body telescoped in said guide tube, and said support body terminating in a threaded conical portion at one end and an opposite end; there being a plurality of openings in said guide tube juxtaposed around said conical portion; a pressure pad having an outer surface arranged to bear against the surface of the bore hole and a threaded inner surface mating with said threaded conical portion mounted in each said opening and arranged for limited reciprocable movement in said openings; means for preventing turning of said guide tube means; means on said support body for rotating the same so as to reciprocably move the pressure pads inwardly and outwardly in relation to said guide tube means; and means for measuring the rotation of said support means; whereby rotation of said support means indicates the relative hardness of the material being tested.

2. A device according to claim 1 wherein four pressure pads are mounted on said conical member.

3. A device according to claim 1 wherein said means for preventing turning is a head mounted on said guide tube and said means for measuring the rotation is mounted on said head cooperative with an indicator mounted on said support body.

4. A device according to claim 3 wherein said means for measuring the amount of rotation of said conical is a circular guage for measuring the rotation of said conical member and thereby provide a means for measuring the amount of movement of said pressure pads.

5. A device according to claim 1 wherein four pressure pads are mounted at about 90° apart around said guide means.

6. A device according to claim 2 wherein each said pressure pad mounted on said inner member has an outer surface mating with the surface of said bore, and said opposite end of said support body extends outwardly beyond said outer tube and terminates in a rotating tool gripping portion.

No references cited.

RICHARD C. QUEISSER, *Primary Examiner.*